United States Patent
Ono et al.

(10) Patent No.: US 11,181,385 B2
(45) Date of Patent: Nov. 23, 2021

(54) MAP DATA GENERATING APPARATUS, TERMINAL APPARATUS, AND MAP DATA GENERATING METHOD

(71) Applicant: Mitsubishi Electric Corporation, Tokyo (JP)

(72) Inventors: Takahiro Ono, Tokyo (JP); Yasushi Kodaka, Tokyo (JP); Keisuke Inoue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 260 days.

(21) Appl. No.: 16/327,476

(22) PCT Filed: Oct. 25, 2016

(86) PCT No.: PCT/JP2016/081593
§ 371 (c)(1),
(2) Date: Feb. 22, 2019

(87) PCT Pub. No.: WO2018/078722
PCT Pub. Date: May 3, 2018

(65) Prior Publication Data
US 2020/0370895 A1    Nov. 26, 2020

(51) Int. Cl.
*G01C 21/32* (2006.01)
*G01C 21/34* (2006.01)
*G01C 21/36* (2006.01)

(52) U.S. Cl.
CPC ........... *G01C 21/32* (2013.01); *G01C 21/343* (2013.01); *G01C 21/3446* (2013.01); *G01C 21/3638* (2013.01)

(58) Field of Classification Search
CPC .. G01C 21/32; G01C 21/343; G01C 21/3446; G01C 21/3638; G06T 3/0043
See application file for complete search history.

(56) References Cited

U.S. PATENT DOCUMENTS

| 5,717,905 A * | 2/1998 | Iwamoto | G06T 11/20 |
| | | | 345/442 |
| 6,260,000 B1 * | 7/2001 | Karasaki | G06T 17/00 |
| | | | 33/554 |

(Continued)

FOREIGN PATENT DOCUMENTS

| JP | 2010-266306 A | 11/2010 |
| JP | 2016-76357 A | 5/2016 |
| WO | WO 2017/175433 A1 | 10/2017 |

OTHER PUBLICATIONS

Bradley, "Numerically Controlled Machining From Three Dimensional Machine Vision Data," PhD Dissertation, University of Victoria, Department of Mechanical Engineering, 1992, pp. 1-156 (total pages 168).

(Continued)

*Primary Examiner* — Anshul Sood
(74) *Attorney, Agent, or Firm* — Birch, Stewart, Kolasch & Birch, LLP

(57) ABSTRACT

It is an object of the present invention to provide a technique capable of reducing a difference between a three-dimensional shape represented by map data, using approximation, and a real three-dimensional shape. A map data generating apparatus is a map data generating apparatus capable of generating map data representing a three-dimensional shape, using approximation, the map data generating apparatus including: an acquisition part that acquires a shape point sequence indicating the three-dimensional shape, and a control part that generates an arc passing three object points, based on the three object points in the shape point sequence acquired by the acquisition part, and determines whether an approximation division point that should not be approximated in the three-dimensional shape is included in the three object points, based on the arc.

12 Claims, 11 Drawing Sheets

(56) References Cited

U.S. PATENT DOCUMENTS

| | | | | |
|---|---|---|---|---|
| 9,170,115 | B2* | 10/2015 | Kim | G01C 21/32 |
| 10,429,814 | B2* | 10/2019 | Noda | G05B 19/19 |
| 2006/0044305 | A1* | 3/2006 | Katka | G06T 11/203 |
| | | | | 345/419 |
| 2007/0009135 | A1* | 1/2007 | Ishiyama | G06T 7/20 |
| | | | | 382/103 |
| 2010/0295858 | A1* | 11/2010 | Sugama | G06T 11/203 |
| | | | | 345/442 |
| 2011/0218724 | A1* | 9/2011 | Iida | G06N 20/00 |
| | | | | 701/70 |
| 2012/0287128 | A1* | 11/2012 | Chang | G06T 17/20 |
| | | | | 345/423 |
| 2016/0187866 | A1* | 6/2016 | Noda | G05B 19/4093 |
| | | | | 700/187 |
| 2017/0125212 | A1* | 5/2017 | Tsunoda | G03F 7/2037 |

OTHER PUBLICATIONS

Ong et al., "An optimization approach for biarc curve-fitting of B-spline curves," Computer-Aided Design, vol. 28, No. 12, Elsevier Science Ltd., 1996, pp. 951-959.

International Search Report issued in PCT/JP2016/081593 (PCT/ISA/210), dated Dec. 27, 2016.

Murai et al., "A study on the Automatic Design of Center Lines in the Route Location System", Proceedings of the Japan Society of Civil Engineers, No. 174, Feb. 20, 1970, pp. 73-83.

\* cited by examiner

F I G. 9
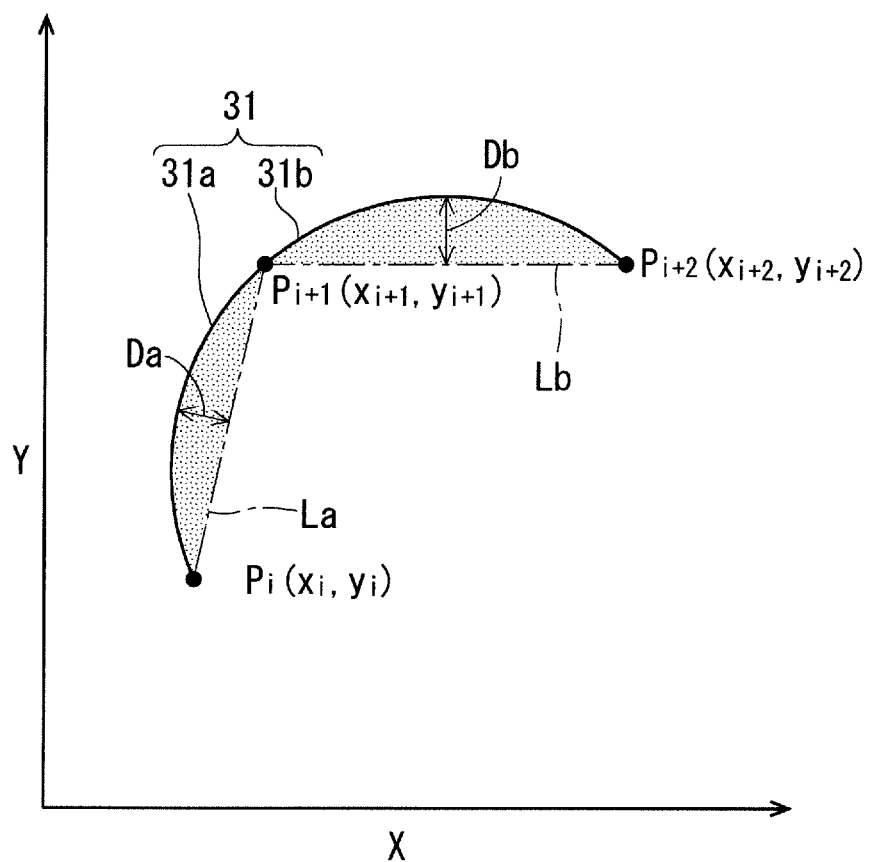

F I G . 1 6
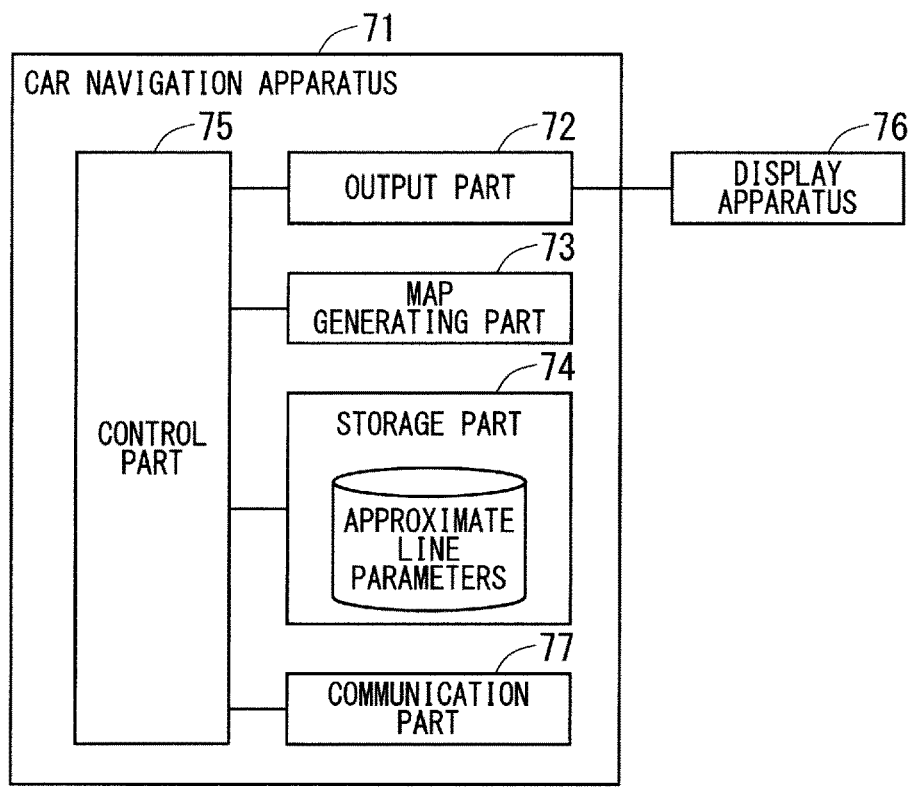
F I G . 1 7
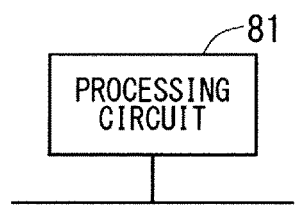
F I G . 1 8
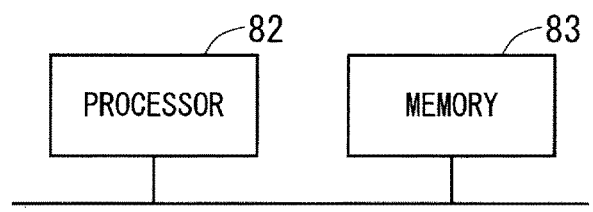

MAP DATA GENERATING APPARATUS, TERMINAL APPARATUS, AND MAP DATA GENERATING METHOD

TECHNICAL FIELD

The present invention relates to a map data generating apparatus capable of generating map data and a method for the same, and a terminal apparatus relating to the map data.

BACKGROUND ART

In recent years, there has been proposed map data capable of representing three-dimensional shapes of a road surface, a building and equipment around a road, and the like by a three-dimensional point group. The three-dimensional point group can be acquired from a real thing by using a combination of surveying functions of a GNSS (Global Navigation Satellite System) apparatus, a laser radar, a camera and the like. Since an acquired data amount of three-dimensional point group information is very large as it is, only necessary information is extracted. For example, since in a map used in in-vehicle equipment, three-dimensional positions and three-dimensional shapes of a center position of a road, a center position of each lane, a compartment lane, a sign, and the like are useful, these pieces of information are extracted as three-dimensional shape information.

However, since a data amount of the three-dimensional shape information tends to be large, not only a technique for appropriately extracting the three-dimensional shape information but also a technique for compressing the three-dimensional shape information have been required. As such a technique, there has been proposed a technique of compressing the data amount of three-dimensional shape information by representing a three-dimensional shape, using an approximate line.

For example, in Patent Document 1, as data of a three-dimensional traveling locus acquired by a position sensor during road traveling, data of a plane traveling locus is generated, using a horizontal alignment. Based on the data of the plane traveling locus, a control point, an arc related to the control point, and a relaxation curve connected to the arc are sequentially generated to be stored in a storage medium or the like. This makes it possible to represent a smooth center line corresponding to a center line of a three-dimensional road, based on the generated arc, the relaxation curve and the like.

PRIOR ART DOCUMENT

Patent Document

Patent Document 1: Japanese Patent Application Laid-Open No. 2010-266306

SUMMARY

Problem to be Solved by the Invention

However, in the conventional technique, in a process of deriving the approximate line, only an error between one point of a point sequence indicating the three-dimensional shape and the approximate line is evaluated, and an error at a point other than the relevant one point is not taken into consideration. Therefore, according to the conventional technique, there has been a problem that an angular shape, which should not be smooth in the three-dimensional shape, may be represented by a smooth approximate line, so that a difference between the three-dimensional shape represented by the map data and a real three-dimensional shape becomes relatively large. Since, for example, shapes of a road edge and a fence root often include an angular shape, as compared with a shape of a road center line, according to the conventional technique, there has been a problem that the shapes of the road edge and the fence root represented by the map data may largely deviate from real shapes.

The present invention has been made in light of the above problem, and it is an object of the present invention to provide a technique capable of reducing a difference between a three-dimensional shape represented by map data, using approximation, and a three-dimensional shape of a real thing.

Means to Solve the Problem

A map data generating apparatus according to the present invention is a map data generating apparatus capable of generating map data representing a three-dimensional shape, using approximation, the map data generating apparatus including: an acquisition part that acquires a shape point sequence indicating the three-dimensional shape; and a control part that generates an arc passing three object points, based on the three object points, and determines whether an approximation division point that should not be approximated in the three-dimensional shape is included in the three object points, based on the arc, the three object points being any one of three points whose order in the shape point sequence is continuous, and three points whose order in the shape point sequence is every N in the shape point sequence acquired by the acquisition part, where N is a natural number.

Effects of the Invention

According to the present invention, it is determined whether or not the approximation division point that should not be approximated in the three-dimensional shape is included in the three object points. This makes it possible to reduce the difference between the three-dimensional shape represented by the map data, using the approximation, and the real three-dimensional shape.

The objects, features, aspects, and advantages of the present invention will become more apparent from the following detailed description and the accompanying drawings.

BRIEF DESCRIPTION OF DRAWINGS

FIG. 9 is a diagram for describing the operation of the approximation division point extracting part according to the fourth embodiment.

FIG. 16 is a block diagram showing a configuration of a car navigation apparatus according to a modification of the eighth embodiment.

FIG. 17 is a block diagram showing a hardware configuration of a map data generating apparatus according to another modification.

FIG. 18 is a block diagram showing a hardware configuration of a map data generating apparatus according to another modification.

DESCRIPTION OF EMBODIMENTS

First Embodiment

A map data generating apparatus according to a first embodiment of the present invention is an apparatus capable of generating map data, and the map data includes map data representing a three-dimensional shape using approximation.

Figure 1:
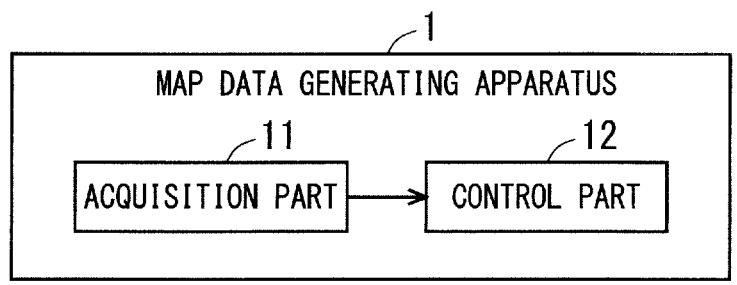
FIG. 1 is a block diagram showing a configuration of a map data generating apparatus according to a first embodiment.

FIG. 1 is a block diagram showing a configuration of a map data generating apparatus 1 according to the first embodiment of the present invention. The map data generating apparatus 1 in FIG. 1 includes an acquisition part 11 and a control part 12.

The acquisition part 11 acquires a shape point sequence, which is a point sequence indicating a three-dimensional shape. For example, as the shape point sequence, a sequence of a plurality of points arranged on an outline of the three-dimensional shape or the like is used. The acquisition part 11 may acquire the shape point sequence from an apparatus outside or inside the map data generating apparatus 1 or the acquisition part 11 may generate the shape point sequence, based on other information.

The control part 12 decides three object points from the shape point sequence acquired by the acquisition part 11. The three object points are any one of three points whose order in the shape point sequence is continuous and three points whose order in the shape point sequence is every N, where N is a natural number.

The control part 12 generates an arc passing the three object points, based on the three object points. Since a circle includes an arc, even in a configuration where a circle is generated instead of an arc, an arc is consequently generated.

Based on the generated arc, the control part 12 determines whether or not an approximation division point that should not be approximated in the three-dimensional shape is included in the three object points. The approximation division point can also be called an approximation division position.

According to the map data generating apparatus 1 according to the present first embodiment as described above, it is determined whether or not the approximation division point that should not be approximated in the three-dimensional shape is included in the three object points. This makes it possible to suppress representing an angular shape of the three-dimensional shape by a smooth approximate line, so that it is possible to reduce a difference between the three-dimensional shape represented by the map data, using the approximation, and the real three-dimensional shape.

Second Embodiment

Figure 2:
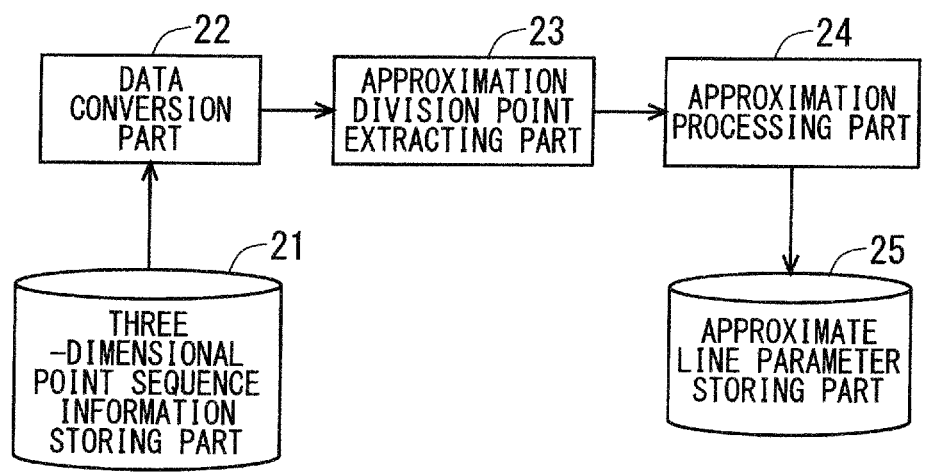
FIG. 2 is a block diagram showing a configuration of a map data generating apparatus according to a second embodiment.

FIG. 2 is a block diagram showing a configuration of the map data generating apparatus 1 according to a second embodiment of the present invention. Hereinafter, of components described in the present second embodiment, the same reference signs will be given to components that are the same as, or similar to those of the first embodiment, and different components will be mainly described.

The map data generating apparatus 1 in FIG. 2 includes a three-dimensional point sequence information storing part 21, a data conversion part 22, an approximation division point extracting part 23, an approximation processing part 24, and an approximate line parameter storing part 25. The data conversion part 22 corresponds to the acquisition part 11 in FIG. 1 described in the first embodiment. The approximation division point extracting part 23 and the approximation processing part 24 correspond to the control part 12 in FIG. 1 described in the first embodiment. Each of the components of the map data generating apparatus 1 shown in FIG. 2 will be described in detail below.

<Three-Dimensional Point Sequence Information Storing Part 21>

The three-dimensional point sequence information storing part 21 stores data of a shape point sequence indicating a three-dimensional shape indicating a route, a structure, and the like as three-dimensional point sequence information. In the following description, a route and a structure or the like as an object of data compression processing may be referred to as an "object shape". While in the following description, it is assumed that the object shape is a road edge, it is not limited to this. For example, the object shape may be a shape of a lane center line, a structure such as a fence, a center of a road, a virtual line, a compartment lane, a line indicating a position of a three-dimensional structure, or the like.

<Data Conversion Part 22>

The data conversion part 22 acquires the three-dimensional point sequence information of the object shape from the three-dimensional point sequence information storing part 21. Based on the acquired three-dimensional point sequence information, the data conversion part 22 converts three-dimensional spatial coordinates into two-dimensional plane coordinates, which is obtained by removing a one-dimensional coordinate component from the three-dimensional spatial coordinates. The data conversion part 22 holds the two-dimensional plane coordinates and holds information corresponding to the removed one-dimensional coordinate component in a storing part or the like (not shown). For example, as in a technique described in Japanese Patent Application No. 2016-076357, when the data conversion part 22 is configured to convert the three-dimensional information into the two-dimensional information obtained by removing an altitude component from the three-dimensional information, the data conversion part 22 holds the two-dimensional information, and also holds gradient data corresponding to the altitude component in the storing part (not shown) or the like. The data conversion part 22 outputs the two-dimensional shape point sequence obtained by the above-described conversion to the approximation division point extracting part 23.

However, depending on an implementation form, the data conversion part 22 may output the three-dimensional point sequence information acquired from the three-dimensional point sequence information storing part 21 to the approximation division point extracting part 23 as it is without performing the above-described conversion. In the above-described configuration, the three-dimensional shape point sequence is outputted from the data conversion part 22 to the approximation division point extracting part 23. If the above-described conversion and its inverse conversion are performed appropriately, two dimensions and three dimensions can be handled substantially identically, so that the two dimensions and the three dimensions in the following description are substantially the same.

<Approximation Division Point Extracting Part 23>

The approximation division point extracting part 23 generates the arc and determines the approximation division point for the three object points in the shape point sequence acquired by the acquisition part 11. Specific operation of the approximation division point extracting part 23 will be described later in detail, using a flowchart.

<Approximation Processing Part 24>

If the approximation division point extracting part 23 determines that the approximation division point is not included in the three object points, the approximation processing part 24 generates an approximate line that approximates the three-dimensional shape, based on all the shape point sequences acquired by the data conversion part 22.

On the other hand, if the approximation division point extracting part 23 determines that the approximation division point is included in the three object points, the approximation processing part 24 divides the shape point sequence acquired by the data conversion part 22 by the approximation division point, and generates an approximate line that approximates the three-dimensional shape in the map data, based on the divided shape point sequence.

For example, if the approximation division point extracting part 23 determines that there is one approximation division point between a start point and an end point of the shape point sequence, the approximation processing part 24 generates a first approximate line, based on the start point, the approximation division point, and points therebetween, and generates a second approximate line, based on the end point, the approximation division point, and points therebetween.

Further, for example, if the approximation division point extracting part 23 determines that there are two or more approximation division points between the start point and the end point of the shape point sequence, the approximation processing part 24, similarly to the above-described case, generates the first approximate line and the second approximate line, and generates a third approximate line, based on two adjacent approximation division points and points therebetween.

For generating an approximate line, for example, general approximation such as a least squares method is used. As an approximation expression representing the approximate line, for example, a functional expression used for general approximation such as a polynomial including a monic polynomial is used. Each approximate line may be a line obtained by joining a plurality of partial lines represented by a plurality of approximation expressions different from one another.

<Approximate Line Parameter Storing Part 25>

The approximate line parameter storing part 25 stores parameters of the approximate line generated by the approximation processing part 24. The parameters of the approximate line include, for example, coordinate information of an edge point of the approximate line, parameters of the approximation expression representing the approximate line, and the like.

<Operation>

Figure 3:
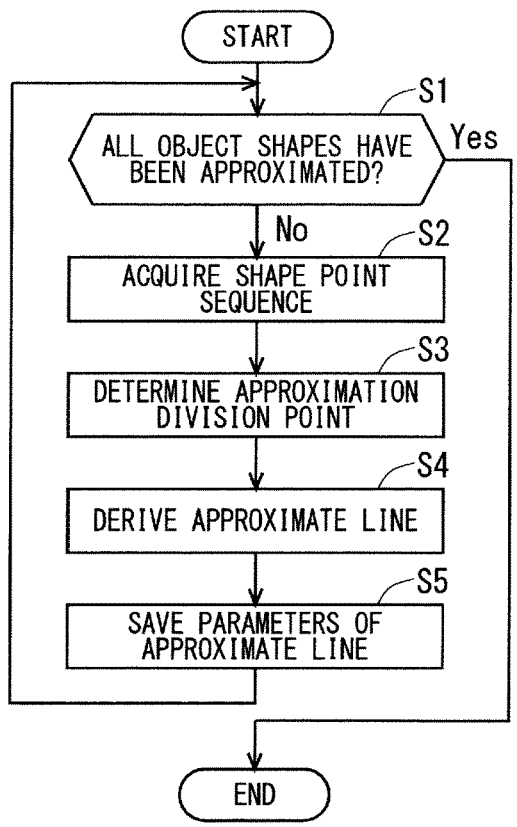
FIG. 3 is a flowchart showing operation of the map data generating apparatus according to the second embodiment.

FIG. 3 is a flowchart showing operation of the map data generating apparatus 1 according to the present second embodiment.

In step S1, the data conversion part 22 examines the three-dimensional point sequence information stored in the three-dimensional point sequence information storing part 21, and determines whether all the object shapes to be approximated have been approximated. If it is determined that not all of them have been approximated, the processing proceeds to step S2, and if it is determined that all of them have been approximated, the processing in FIG. 3 ends.

In step S2, the data conversion part 22 acquires an object shape not approximated, from the three-dimensional point sequence information storing part 21, and appropriately performs the above-described dimension conversion for the object shape. At the end of step S2, the data conversion part 22 acquires a shape point sequence.

In step S3, the approximation division point extracting part 23 determines whether there is an approximation division point in the shape point sequence acquired in step S2.

In step S4, the approximation processing part 24 generates an approximate line of the object shape, based on a determination result in step S3. That is, the approximation processing part 24 derives the approximate line.

In step S5, the approximate line parameter storing part 25 stores the parameters of the approximate line generated in step S4. Thereafter, the processing returns to step S1. By carrying out steps S1 to S5 once, approximation is made to one object shape to be approximated, and steps S1 to S5 are repeated, by which all object shapes to be approximated are approximated.

<Operation of Approximation Division Point Extracting Part 23>

Figure 4:
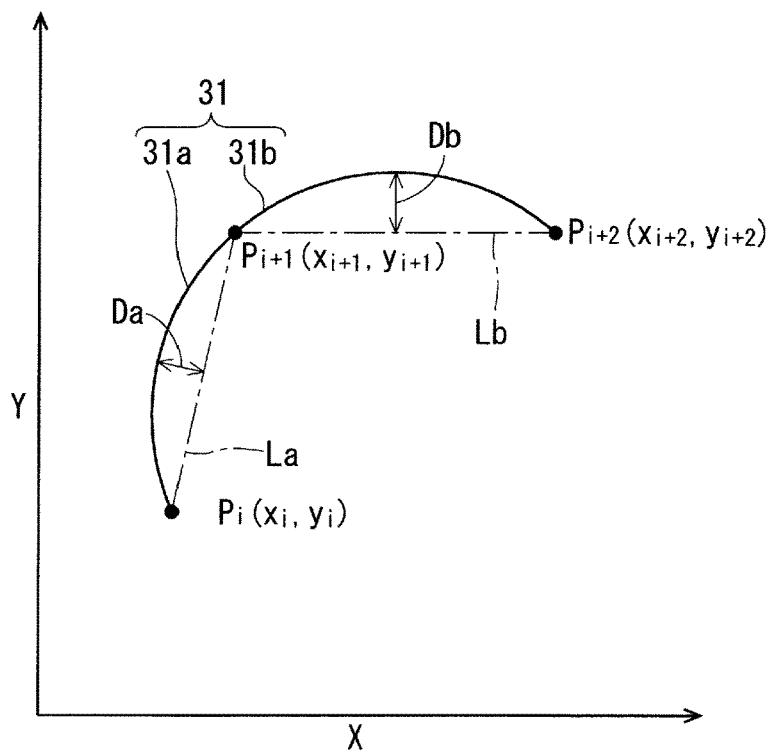
FIG. 4 is a diagram for describing operation of an approximation division point extracting part according to the second embodiment.
Figure 5:
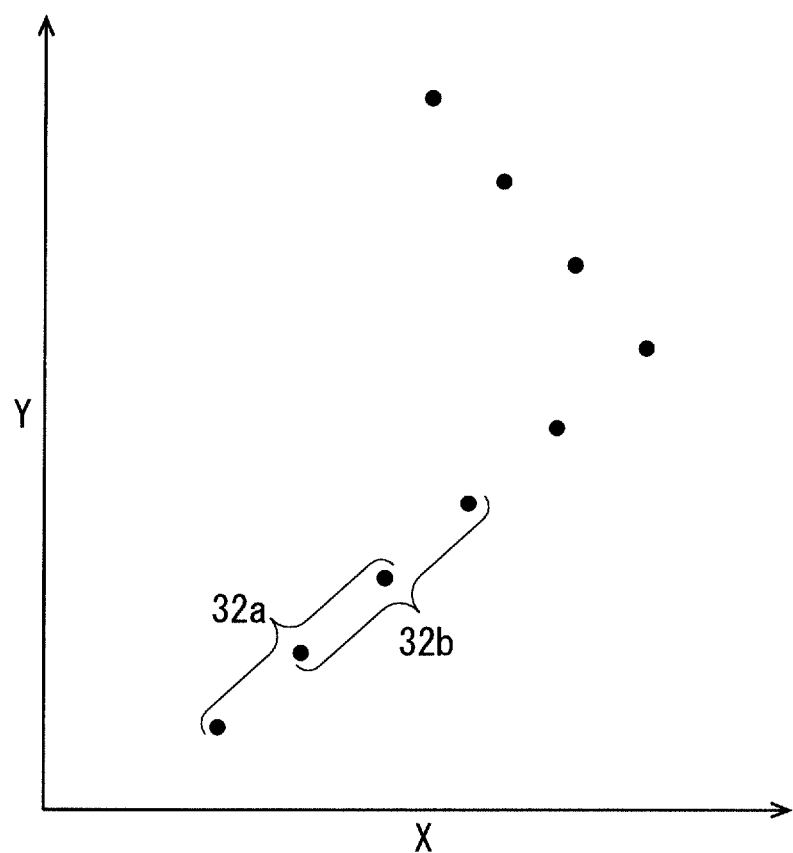
FIG. 5 is a diagram for describing the operation of the approximation division point extracting part according to the second embodiment.

FIGS. 4 and 5 are diagrams for describing operation of the approximation division point extracting part 23 according to the present second embodiment, that is, the operation in step S3 in FIG. 3. Hereinafter, a description will be given of a case where the three object points are three points whose order in the shape point sequence is continuous.

In FIG. 4, as the three object points in the shape point sequence of the object shape, a point $P_i(x_i, y_i)$, a point $P_{i+1}(x_{i+1}, y_{i+1})$, and a point $P_{i+2}(x_{i+2}, y_{i+2})$ are shown. In this case, as shown in FIG. 4, the approximation division point extracting part 23 generates an arc 31 passing the three object points.

Next, the approximation division point extracting part 23 finds an index indicating a difference between a line segment La connecting the middle point $P_{i+1}$ and the other point $P_i$ of the three object points, and a partial arc 31a of the arc 31 corresponding to the line segment La. In the present second embodiment, the partial arc 31a corresponding to the line segment La is a portion on an La side of portions obtained by dividing the arc 31 by the middle point $P_{i+1}$. Further, in the present second embodiment, the approximation division point extracting part 23 finds a distance Da between a predetermined point on the line segment La and the partial arc 31a as the above-described index.

Similarly, the approximation division point extracting part 23 finds a distance Db between a predetermined point on a line segment Lb and a partial arc 31b as an index indicating a difference between the line segment Lb connecting the middle point $P_{i+1}$ and the other point $P_{i+2}$ of the three object points, and a partial arc 31b of the arc 31 corresponding to the line segment Lb.

The approximation division point extracting part 23 determines that the approximation division point is included in the three object points when the larger one of the distances Da, Db is larger than a predetermined threshold value. When it is determined that the approximation division point is included in the three object points, the approximation division point extracting part 23 according to the present second embodiment determines that the approximation division point is the middle point $P_{i+1}$ of the three object points.

The approximation division point extracting part 23 performs the generation of the arc and the determination of the approximation division point as described above while changing the three object points. In this case, as shown in FIG. 5, the approximation division point extracting part 23 first decides three points 32a including the start point in the shape point sequence as the three object points, and performs, for the three points 32a, the above-described generation of the arc and determination of the approximation division point. Thereafter, the approximation division point extracting part 23 decides, as three object points, three points 32b obtained by shifting one by one from the three points 32a to the end point side in the shape point sequence, and performs, for the three points 32b, the above-described generation of the arc and determination of the approximation division. By repeating the above-described change of the three object points, the approximation division point extracting part 23 performs the generation of the arcs and the determination of the approximation division points for all points of the shape point sequence. However, the three points that are initially used as three object points, and the order thereof are not limited to the foregoing.

Figure 6:
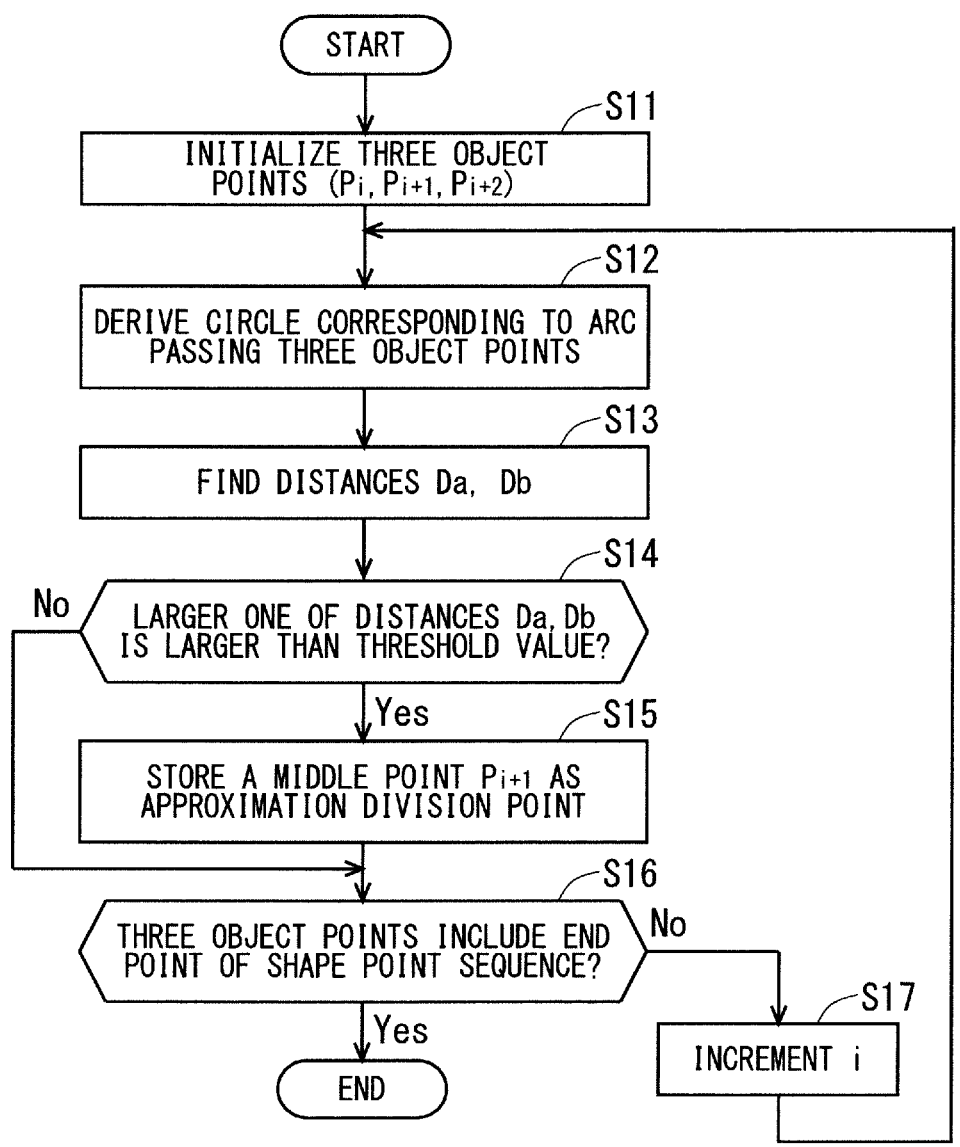
FIG. 6 is a flowchart showing the operation of the approximation division point extracting part according to the second embodiment.

FIG. 6 is a flowchart showing the operation of the approximation division point extracting part 23 according to the present second embodiment.

In step S11, the approximation division point extracting part 23 initializes the points $P_i$, $P_{i+1}$, $P_{i+2}$, which are the three object points with i=0. However, in the case of 1 origin that starts counting a number of suffix i from 1 instead of 0 origin that starts counting a number of suffix i from 0, the three object points are initialized with i=1. In the following description, the 0 origin is employed, and the case where the initialization is performed with i=0 will be described.

In step S12, the approximation division point extracting part 23 derives a circle corresponding to the arc passing the points $P_i$, $P_{i+1}$, $P_{i+2}$. Here, the approximation division point extracting part 23 substitutes coordinates of the three points one by one into the following expression (1) which is a general expression of a circle, acquires a 3-element simultaneous equations (j=i, i+1, i+2) with respect to l, m, n, and solves the 3-element simultaneous equations to thereby derive the circle.

[Expression 1]

$$x_j^2 + lxx_j + y_j^2 + mxy_j + n = 0 \quad (1)$$

In step S13, the approximation division point extracting part 23 finds the distance Da between the predetermined point on the line segment La connecting the middle point $P_{i+1}$ and the other point $P_i$ of the three object points, and the partial arc 31a. Hereinafter, a case where the predetermined point is a midpoint of the line segment La will be described as an example. In this case, the distance Da is a length of a camber of the partial arc 31a.

As a preliminary stage of finding Da, which is a length of the camber of the partial arc 31a with respect to the coordinates $P_i$, $P_{i+1}$, the approximation division point extracting part 23 substitutes the coordinates $P_i$, $P_{i+1}$ of the points into the following expression (2) to find a half length Ba of the line segment La, and substitutes l, m, n found in step S12 into the following expression (3) to find a radius r of the circle.

[Expression 2]

$$Ba = \frac{\sqrt{(x_i - x_{i+1})^2 + (y_i - y_{i+1})^2}}{2} \quad (2)$$

[Expression 3]

$$r = \sqrt{\frac{l^2 + m^2}{4} - n} \quad (3)$$

Then, the approximation division point extracting part 23 substitutes the found length Ba and the found radius r of the circle into the following expression (4) to find the distance Da, which is the length of the camber of the partial arc 31a.

[Expression 4]

$$Da = r - \sqrt{r^2 - Ba^2} \quad (4)$$

Similarly to the distance Da, the approximation division point extracting part 23 finds the distance Db, which is the length of the camber of the partial arc 31b.

In step S14, the approximation division point extracting part 23 determines whether or not the larger one of the distances Da, Db found in step S13 is larger than the predetermined threshold value. If the approximation division point extracting part 23 determines that the distance is larger than the threshold value, the processing proceeds to step S15, and if the approximation division point extracting part 23 determines that the distance is equal to or less than the threshold value, the processing proceeds to step S16. The approximation division point extracting part 23 may determine whether or not a sum of the distances Da and Db (=Da+Db) is larger than a threshold value instead of determining whether or not the larger one of the distances Da, Db is larger than the threshold value.

In step S15, the approximation division point extracting part 23 stores the middle point $P_{i+1}$ as the approximation division point, for example, in a storage apparatus such as a cache memory (not shown). Thereafter, the processing proceeds to step S16.

In step S16, the approximation division point extracting part 23 determines whether or not the three object points include the end point of the shape point sequence, that is, whether or not i=M−2. Note that M is a total number of points in the shape point sequence. If i=M−2, it is determined that the generation of the arcs and the determination of the approximation division points have been performed for all points of the shape point sequence, and the processing in FIG. 6 ends. If i<M−2 instead of i=M−2, it is determined that the generation of the arcs and the determination of approximation division points have not been performed for all the points of the shape point sequence, and the processing proceeds to step S17.

In step S17, the approximation division point extracting part 23 increments i, and the processing returns to step S12.

In the foregoing, the case where three points whose order in the shape point sequence is continuous are used as three object points has been described. On the other hand, in the case of using, as the three object points, three points whose order in the shape point sequence is every N, in the above description, a point $P_{i+N+1}(x_{i+N+1}, y_{i+N+1})$ and a point $P_{i+2N+2}(x_{i+2N+2}, y_{i+2N+2})$ may be used instead of the point $P_{i+1}(x_{i+1}, y_{i+1})$ and the point $P_{i+2}(x_{i+2}, y_{i+2})$.

Gist of Second Embodiment

According to the above-described map data generating apparatus 1 according to the present second embodiment, similarly to the first embodiment, it is determined whether or not the approximation division point that should not be approximated in the three-dimensional shape is included in the three object points, so that it is possible to obtain effects similar to those of the first embodiment.

Moreover, in the present second embodiment, if the distance between the line segment and the partial arc is larger than the threshold value, it is determined that the approximation division point is included in the three object points. As a result, it is possible to extract the appropriate approximation division point from the shape point sequence.

In the present second embodiment, the shape point sequence acquired by the data conversion part 22 is divided by the approximation division point, and an approximate line that approximates the three-dimensional shape in the map data is generated, based on the divided shape point sequence. According to the above-described configuration, it is unnecessary to perform recursive approximation processing in the approximation processing part 24, so that processing load can be reduced.

Moreover, in the present second embodiment, by repeating the change of the three object points, the generation of the arcs and the determination of the approximation division points are performed for all the points of the shape point sequence. This makes it possible to suppress mistakes in extraction of the approximation division points.

Third Embodiment

A block configuration of the map data generating apparatus 1 according to a third embodiment of the present invention is the same as the block configuration in FIG. 2 described in the second embodiment. Hereinafter, of components described in the present third embodiment, the same reference signs will be given to components that are the same as or similar to those of the second embodiment, and different components will be mainly described.

In the above-described second embodiment, the approximation division point extracting part 23 generates the arcs and determines the approximation division points for all the points of the shape point sequence. In contrast, in the present third embodiment, the approximation division point extracting part 23 uses, in the shape point sequence, three points designated from an outside of the map data generating apparatus 1 as the three object points. As the outside of the map data generating apparatus 1, a user, a communication apparatus that transmits an operation result of the user, or the like is assumed.

Figure 7:
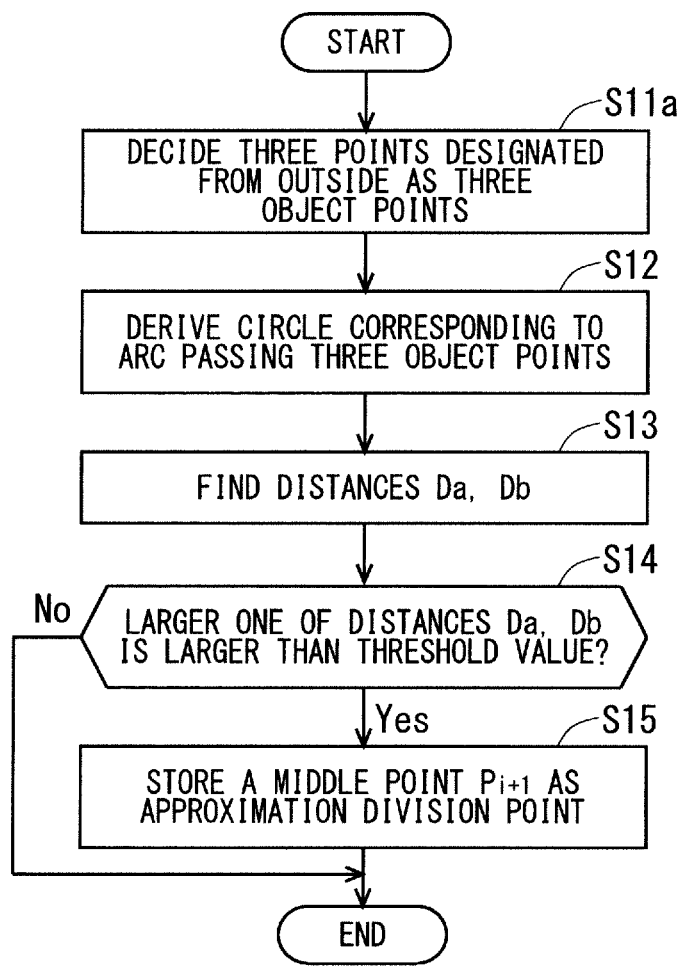
FIG. 7 is a flowchart showing operation of an approximation division point extracting part according to a third embodiment.

FIG. 7 is a flowchart showing operation of the approximation division point extracting part 23 according to the present third embodiment. The operation in FIG. 7 is similar to operation resulting from changing step S11 to step S11a and deleting steps S16 and S17, in the operation of FIG. 6. Here, in step S11a, the three points designated from the outside are decided as the three object points.

Gist of Third Embodiment

According to the above-described map data generating apparatus 1 according to the present third embodiment, when there is a portion that is desired to be evaluated in advance in the three-dimensional shape, it is possible to make a determination only for that portion. Therefore, it is possible to shorten time for extracting the approximation division point.

Fourth Embodiment

A block configuration of the map data generating apparatus 1 according to a fourth embodiment of the present invention is the same as the block configuration in FIG. 2 described in the second embodiment. Hereinafter, of components described in the present fourth embodiment, the same reference signs will be given to components that are the same as or similar to those of the second embodiment, and different components will be mainly described.

In the above-described second embodiment, as shown in FIG. 4, the distance Da between the predetermined point on the line segment La and the partial arc 31a is used as the index indicating the difference between the line segment La and the partial arc 31a. In contrast, in the present fourth embodiment, as the index indicating the difference between the line segment La and the partial arc 31a, an area of a region surrounded by the line segment La and the partial arc 31a is used.

Figure 8:
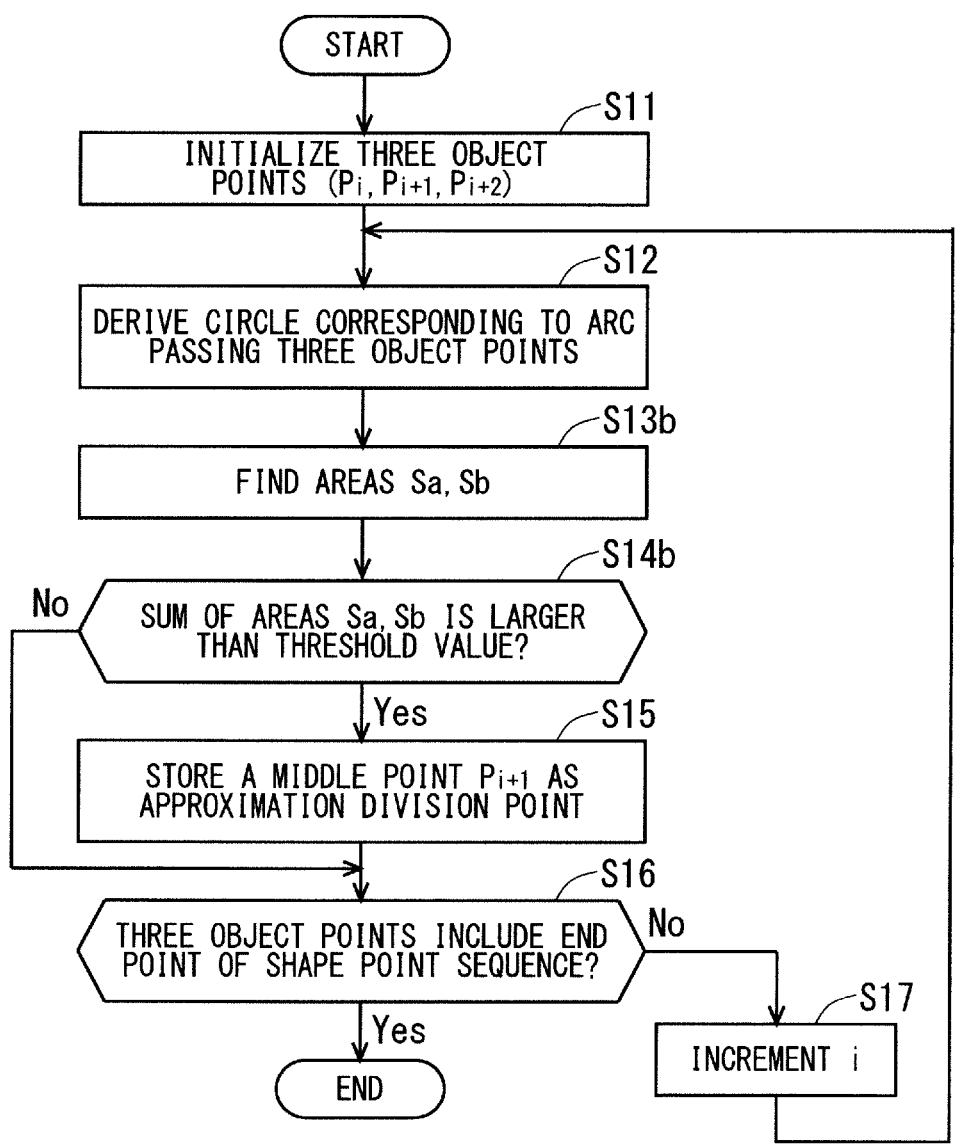
FIG. 8 is a flowchart showing operation of an approximation division point extracting part according to a fourth embodiment.

FIG. 8 is a flowchart showing operation of the approximation division point extracting part 23 according to the present fourth embodiment. The operation in FIG. 8 is similar to operation resulting from changing steps S13 and S14 to steps S13b and S14b, in the operation of FIG. 6. Therefore, in the following, steps S13b and S14b will be mainly described.

In step S13b, similarly to step S13 in FIG. 6, the approximation division point extracting part 23 finds the half length Ba of the line segment La, the radius r of the circle, and the distance Da, which is the length of the camber of the partial arc 31a in FIG. 9. By substituting these into the following expression (5), the approximation division point extracting part 23 finds an area Sa of the region surrounded by the line segment La and the partial arc 31a, that is, a region on a lower left side of a hatched region in FIG. 9.

[Expression 5]

$$Sa = r^2 \sin^{-1}\frac{Ba}{r} - Ba \times (r - Da) \quad (5)$$

Similarly to the area Sa, the approximation division point extracting part 23 finds an area Sb of a region surrounded by the line segment Lb and the partial arc 31b in FIG. 9, that is, a region on an upper right side of a hatched region in FIG. 9.

In step S14b, the approximation division point extracting part 23 determines whether or not a sum (=Sa+Sb) of the areas Sa, Sb found in step S13b is larger than a predetermined threshold value. If it is determined that the sum of the areas is larger than the threshold value, the processing proceeds to step S15, and if it is determined that the sum of the areas is equal to or less than the threshold value, the processing proceeds to step S16. Note that instead of determining whether or not the sum (=Sa+Sb) of the areas Sa, Sb is larger than the threshold value, the approximation division point extracting part 23 may determine whether or not the area of the larger one of the areas Sa, Sb is larger than the threshold value.

Gist of Fourth Embodiment

According to the above-described map data generating apparatus 1 according to the present fourth embodiment, when the area of the region surrounded by the line segment and the partial arc is larger than the threshold value, it is determined that the approximation division point is included in the three object points. As a result, it is possible to extract the appropriate approximation division point from the shape point sequence.

Fifth Embodiment

A block configuration of the map data generating apparatus 1 according to a fifth embodiment of the present invention is the same as the block configuration of FIG. 2 described in the second embodiment. Hereinafter, of the components described in the present fifth embodiment, the same reference signs are given to components that are the same as or similar to those of the second embodiment, and different components will be mainly described.

In the second embodiment described above, when the index indicating the difference between the line segment and the partial arc is larger than the predetermined threshold value, the approximation division point extracting part 23 determines that the approximation division point is included in the three object points. In contrast, in the present fifth embodiment, the approximation division point extracting part 23 generates a first arc by using first three points in the shape point sequence as the three object points. The approximation division point extracting part 23 generates a second arc by using second three points obtained by shifting one by one from the first three points in the shape point sequence as the three object points. When a difference between a curvature of the first arc and a curvature of the second arc is larger than a predetermined threshold value, the approximation division point extracting part 23 determines that the approximation division point is included in a point overlapping between the first three points and the second three points.

Figure 10:
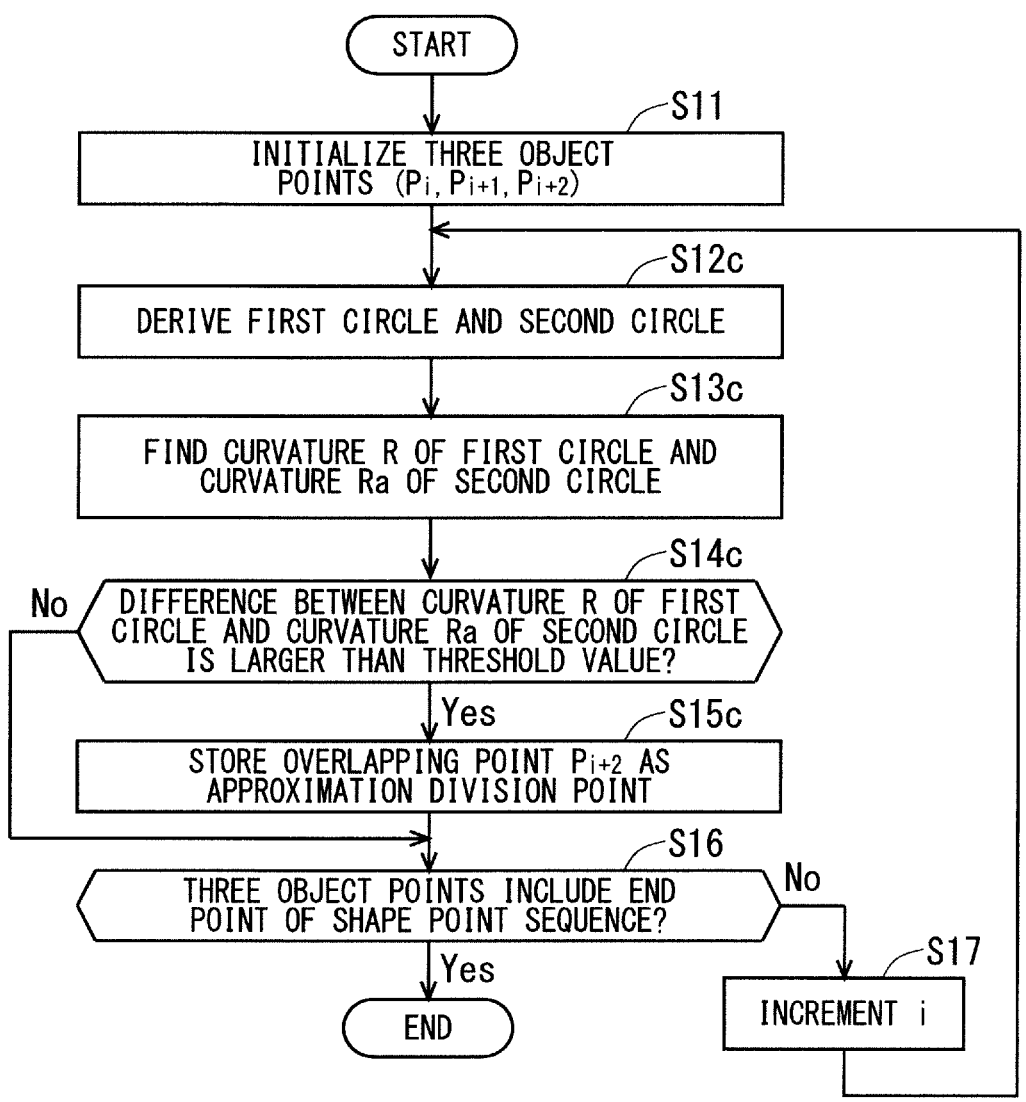
FIG. 10 is a flowchart showing operation of an approximation division point extracting part according to a fifth embodiment.

FIG. 10 is a flowchart showing operation of the approximation division point extracting part 23 according to the present fifth embodiment. The operation in FIG. 10 is similar to operation resulting from changing steps S12 to S15 to steps S12c to S15c, in the operation of FIG. 6. Therefore, in the following, steps S12c to S15c will be mainly described.

In step S12c, the approximation division point extracting part 23 derives a first circle corresponding to the first arc passing the first points $P_i$, $P_{i+1}$, $P_{i+2}$ as in step S12 of FIG. 6. Further, the approximation division point extracting part 23 derives a second circle corresponding to the second arc passing the second points $P_{i+1}$, $P_{i+2}$, $P_{i+3}$ as in step S12 of FIG. 6.

In step S13c, similarly to step S13 in FIG. 6, the approximation division point extracting part 23 finds the radius r of the first circle and a radius ra of the second circle. The approximation division point extracting part 23 finds a curvature R (=1/r) of the first circle from the radius r of the first circle, and finds a curvature Ra (=1/ra) of the second circle from the radius ra of the second circle.

In step S14c, the approximation division point extracting part 23 determines whether or not a difference (=|R−Ra|) between the curvature R of the first circle and the curvature Ra of the second circle is larger than a predetermined threshold value. If it is determined that the difference is larger than the threshold value, the process proceeds to step S15c, and if it is determined that the difference is equal to or less than the threshold value, the process proceeds to step S16.

In step S15c, the approximation division point extracting part 23 stores, as the approximation division point, the $P_{i+2}$ overlapping between the first points $P_i$, $P_{i+1}$, $P_{i+2}$ and the second points $P_{i+1}$, $P_{i+2}$, $P_{i+3}$ in a storage apparatus such as, for example, a cache memory (not shown) or the like. Thereafter, the processing proceeds to step S16.

Gist of Fifth Embodiment

According to the above-described map data generating apparatus 1 of the present fifth embodiment, when the difference between the curvature of the first arc and the curvature of the second arc is larger than the predetermined threshold value, it is determined that the approximation division point is included in the point overlapping each other between the first three points and the second three points. As a result, it is possible to extract the appropriate approximation division point from the shape point sequence.

In the above description, the second three points are the points $P_{i+1}$, $P_{i+2}$, $P_{i+3}$ obtained by shifting the first three points in a direction in which the subscript becomes larger. However, the present invention is not limited to this, and the second three points may be three points $P_{i-1}$, $P_i$, $P_{i+1}$ obtained by shifting the first three points in a direction in which the subscript becomes smaller. The approximation division point extracting part 23 may find the radius rb of the second circle passing the three points $P_{i-1}$, $P_i$, $P_{i+1}$, and find a curvature Rb (=1/rb) of the second circle to determine whether or not a difference (=|R−Rb|) between the curvature R of the first circle and the curvature Rb of the second circle is larger than a predetermined threshold value.

Alternatively, the approximation division point extracting part 23 may find the curvature Ra of the one second circle passing the three points $P_i$, $P_{i+1}$, $P_{i+2}$ and the curvature Rb of the other second circle passing the three points $P_{i-1}$, $P_i$, $P_{i+1}$. The approximation division point extracting part 23 may determine whether or not a larger one of the difference (=|R−Ra|) between the curvature R of the first circle and the curvature Ra of the one second circle, and the difference (=|R−Rb|) between the curvature R of the first circle and the curvature Rb of the other second circle is larger than a predetermined threshold value.

Sixth Embodiment

A block configuration of the map data generating apparatus 1 according to a sixth embodiment of the present invention is the same as the block configuration of FIG. 2 described in the second embodiment. Hereinafter, of the components described in the present sixth embodiment, the same reference signs will be given to components that are the same as or similar to those of the second embodiment, and different components will be mainly described.

In the sixth embodiment, the approximation division point extracting part 23 determines that the approximation division point is included in the three object points when a curvature of an arc passing the three object points is larger than a predetermined threshold value.

Figure 11:
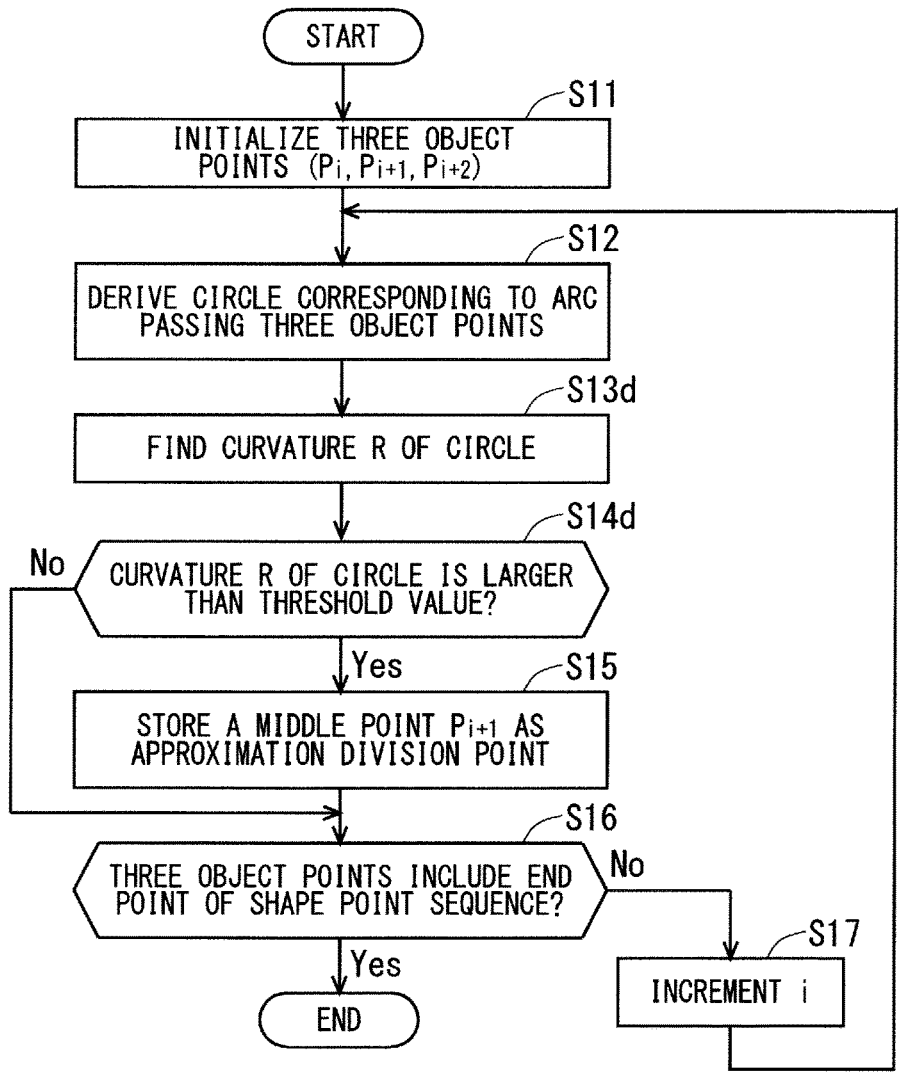
FIG. 11 is a flowchart showing operation of an approximation division point extracting part according to a sixth embodiment.

FIG. 11 is a flowchart showing operation of the approximation division point extracting part 23 according to the present sixth embodiment. The operation in FIG. 11 is similar to the operation resulting from changing steps S13 and S14 to steps S13d and S14d, in the operation of FIG. 6. Therefore, in the following, steps S13d and S14d will be mainly described.

In step S13d, similarly to step S13 in FIG. 6, the approximation division point extracting part 23 finds the radius r of the circle and finds the curvature R (=1/r) of the circle from the found radius r of the circle.

In step S14d, the approximation division point extracting part 23 determines whether or not the curvature R of the circle is larger than the predetermined threshold value. If it is determined that the curvature R is larger than the threshold value, the processing proceeds to step S15, and if it is determined that the curvature R is equal to or less than the threshold value, the processing proceeds to step S16.

Gist of Sixth Embodiment

According to the above-described map data generating apparatus 1 according to the present sixth embodiment, when the curvature of the arc passing the three object points is larger than the predetermined threshold value, it is determined that the approximation division point is included in the three object points. As a result, it is possible to extract the appropriate approximation division point from the shape point sequence.

Seventh Embodiment

A block configuration of the map data generating apparatus 1 according to a seventh embodiment of the present invention is the same as the block configuration of FIG. 2 described in the second embodiment. Hereinafter, of the components described in the present seventh embodiment, the same reference signs will be given to components that are the same as or similar to those of the second embodiment, and different components will be mainly described.

In the above-described second embodiment, while sequentially changing the three object points from the start point to the end point of the shape point sequence acquired by the data conversion part 22, the approximation division point extracting part 23 performs the generation of the arc and the determination of the approximation division point, and the determination result of the approximation division point is used as it is.

In contrast, in the present seventh embodiment, the approximation division point extracting part 23 performs first processing including the generation of the arc and the determination of the approximation division point while sequentially changing the three object points from the start point, which is one edge point of the shape point sequence acquired by the data conversion part 22, to the end point, which is the other edge point. Moreover, the approximation division point extracting part 23 performs second processing including the generation of the arc and the determination of the approximation division point, while sequentially changing the three object points from the end point to the start point of the shape point sequence acquired by the data conversion part 22. Then, when it is determined that the first point is not an approximation division point in at least one of the first processing and the second processing, the approximation division point extracting part 23 determines that the first point is not the approximation division point as a result of the first processing and the second processing.

Figure 12:
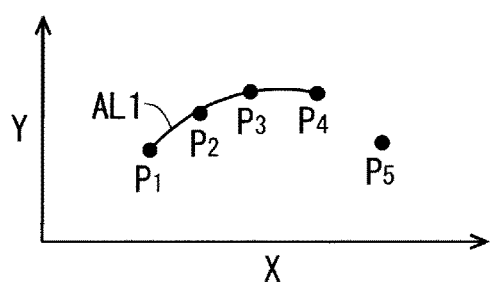
FIG. 12 is a diagram for describing operation of an approximation division point extracting part according to a seventh embodiment.

For example, as shown in FIG. 12, it is assumed that while sequentially changing the three object points from a start point $P_1$ to an end point $P_5$ of the shape point sequence, the approximation division point extracting part 23 has performed the first processing including the generation of the arc and the determination of the approximation division point, and has determined that a point $P_4$ is the approximation division point. In this case, the map data generating apparatus 1 according to the second embodiment generates an approximate line AL1, based on the points $P_1$ to $P_4$, and generates a straight line (not shown) connecting between points $P_4$ and $P_5$.

Figure 13:
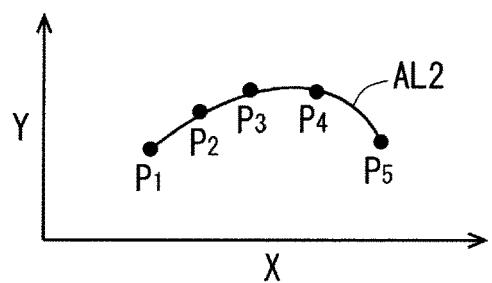
FIG. 13 is a diagram for describing the operation of the approximation division point extracting part according to the seventh embodiment.

In contrast, the approximation division point extracting part 23 according to the present seventh embodiment performs not only the first processing but also the second processing including the generation of the arc and the determination of the approximation division point while sequentially changing the three object points from the end point $P_5$ to the start point $P_1$ of the shape point sequence, as shown in FIG. 13. Even when the approximation division point extracting part 23 determines that the point $P_4$ is the approximation division point in the first processing, if it is determined that the point $P_4$ is not the approximation division point in the second processing, the approximation division point extracting part 23 determines that the point $P_4$ is not the approximation division point as the result of the first processing and the second processing. In this case, the map data generating apparatus 1 according to the seventh embodiment generates an approximate line AL2, based on the points $P_1$ to $P_5$. As a result, the map data generating apparatus 1 according to the present seventh embodiment can reduce a number of approximate lines as compared with the second embodiment, so that the compressibility of data can be enhanced.

As a configuration in which the determination result differs between the first processing and the second processing, for example, a configuration or the like can be considered, where in the configuration of finding the distance Da between the predetermined point on the line segment La connecting the middle point $P_{i+1}$ and the other point $P_i$ of the three object points in FIG. 4, and the partial arc 31a, a position of the predetermined point differs between the first processing and the second processing. In addition to this, it is predicted that the determination results of the first processing and the second processing may be different, depending on a design of the determination as to whether the approximation division point is included in the three object points, based on the arc.

Gist of Seventh Embodiment

According to the above-described map data generating apparatus 1 according to the present seventh embodiment, when it is determined that the first point is not the approximation division point in at least one of the first processing and the second processing, it is determined that the first point is not the approximation division point as the result of the first processing and the second processing. As a result, since the number of approximate lines can be reduced, the compressibility of data can be enhanced.

In addition, it is possible to enhance the compressibility of data to some extent in a case of using an approximate line obtained by combining two curves, as compared with a case of using an approximate line obtained by combining one curve and one straight line. Therefore, when in the first processing, it is determined that the first point is the approximation division point and when in the second processing, it is determined that the first point is not the approximation division point, the approximation division point extracting part 23 may determine that a second point obtained by shifting by one point from the first point to the start point side is the approximation division point.

Figure 14:
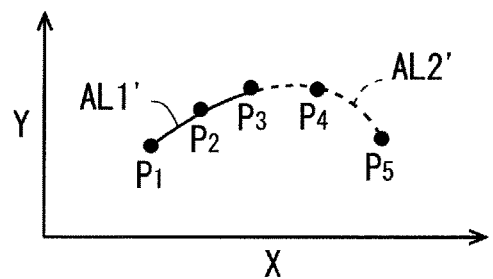
FIG. 14 is a diagram for describing the operation of the approximation division point extracting part according to the seventh embodiment.

For example, in FIG. 12, if in the first processing, it is determined that the point $P_4$ is the approximation division point, and in the second processing, it is determined that the point $P_4$ is not the approximation division point, the point $P_3$ obtained by shifting the point $P_4$ by one point toward the start point $P_1$ may be determined as the approximation division point. In this case, as shown in FIG. 14, the map data generating apparatus 1 generates an approximate line AL1', based on the points $P_1$ to $P_3$, and generates an approximate line AL2', based on the points $P_3$ to $P_5$. According to the above-described configuration, a possibility of using the approximate line obtained by combining two curves is higher than that of using an approximate line obtained by combining one curve and one straight line, so that the compressibility of data can be enhanced.

In the above-described seventh embodiment, it is determined whether the three point approximation on the end point $P_5$ side is possible, but it is not limited thereto, and a number of points to be approximated on the end point $P_5$ side may be three or more. Further, in the above-described seventh embodiment, the first processing and the second processing may be interchanged. That is, the first processing may be processing including the generation of the arc and determination of the approximation division point while sequentially changing the three object points from the end point $P_5$ to the start point $P_1$ of the shape point sequence, and the second processing may be processing including the generation of the arc and the determination of the approximation division point while sequentially changing the three object points from the start point $P_1$ to the end point $P_5$ of the shape point sequence.

Eighth Embodiment

As each of the map data generating apparatuses 1 according to the first to seventh embodiments, for example, an apparatus used by a vendor of map data or the like is assumed. In this case, the map data generated by the map data generating apparatus 1 is stored in the storage apparatus included by a terminal apparatus, and the terminal apparatus can represent the three-dimensional shape, using the map data.

As the terminal apparatus, for example, an in-vehicle terminal apparatus, a portable terminal or the like is used. As the in-vehicle terminal apparatus, for example, a PND (Portable Navigation Device), a car navigation apparatus or the like is used. As the portable terminal, for example, a communication terminal such as a mobile phone, a smartphone, a tablet, or the like is used.

Figure 15:
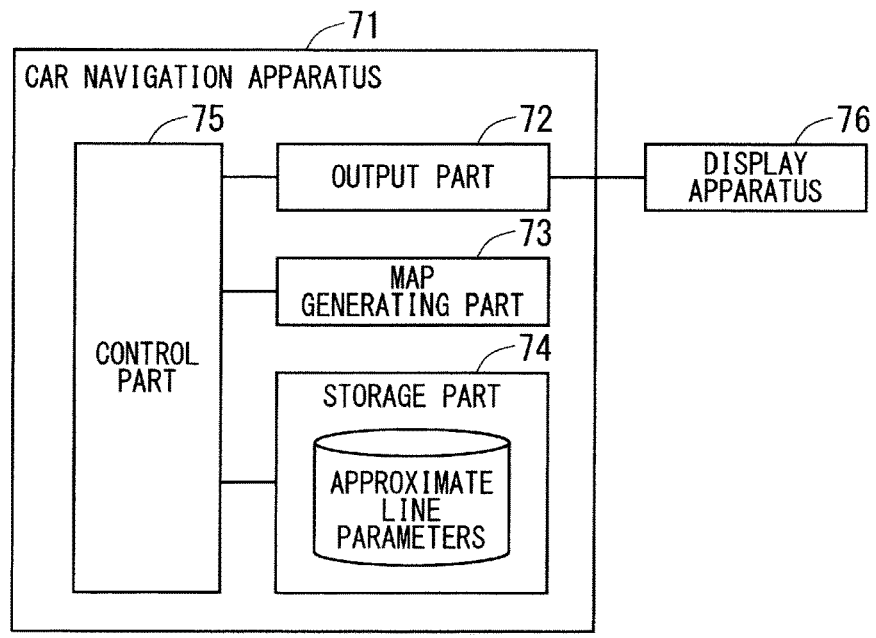
FIG. 15 is a block diagram showing a configuration of a car navigation apparatus according to an eighth embodiment.

FIG. 15 is a block diagram showing a configuration of a car navigation apparatus 71, which is a terminal apparatus. The car navigation apparatus 71 in FIG. 15 includes an output part 72, a map generating part 73, a storage part 74, and a control part 75 that collectively controls them, and is connected to a display apparatus 76.

The storage part 74 stores the map data including the approximate line parameters generated by the map data generating apparatus 1. The control part 75 reads the map data from the storage part 74 as necessary to output it to the map generating part 73, and the map generating part 73 generates a map in which the three-dimensional shape can be represented, based on the map data including the approximate line parameters. The control part 75 outputs the map generated by the map generating part 73 to the display apparatus 76 through the output part 72, and the display apparatus 76 displays the map. In the car navigation apparatus 71 configured as described above, it is possible to display the three-dimensional shape in which a difference from a real three-dimensional shape is suppressed.

Modification of Eighth Embodiment

In the eighth embodiment, the map data generating apparatus 1 is assumed to be an apparatus used by a vendor of the map data or the like, but it is not limited thereto. For example, the map data generating apparatus 1 may be included in a terminal apparatus such as the car navigation apparatus 71.

Specifically, a car navigation apparatus 71 as shown in FIG. 16 is conceivable. The car navigation apparatus 71 in FIG. 16 includes a communication part 77 in addition to the components in FIG. 15.

The communication part 77 communicates with an outside of the car navigation apparatus 71, thereby acquiring the shape point sequence indicating the three-dimensional shape. The control part 75 generates the arc passing the three object points, based on the three object points in the shape point sequence acquired by the communication part 77, and determines whether the approximation division point is included in the three object points, based on the arc. The control part 75 generates the approximate line that approximates the three-dimensional shape, based on the determination result, and stores the parameters of the approximate line in the storage part 74. Even with the car navigation apparatus 71 configured in this way, it is possible to display the three-dimensional shape in which the difference from the real three-dimensional shape is suppressed. Note that this is not limited to the car navigation apparatus 71, but the same applies to a terminal apparatus other than the car navigation apparatus.

Further, the map data generating apparatus 1 described above can also be applied to a map data generating system constructed as a system by appropriately combining a navigation apparatus, a communication terminal including a portable terminal such as a mobile phone, a smartphone, a tablet or the like, functions of applications to be installed in the foregoing, and a server. In this case, the respective functions and components of each of the map data generating apparatuses described above may be disposed so as to be distributed to each of the apparatuses that construct the system, or may be disposed so as to be concentrated in any one of the apparatuses.

Other Modifications

The acquisition part 11 and the control part 12 in the above-described map data generating apparatus 1 are hereinafter referred to as an "acquisition part 11 and the like". The acquisition part 11 and the like are realized by a processing circuit 81 shown in FIG. 17. That is, the processing circuit 81 includes the acquisition part 11 that acquires the shape point sequence indicating the three-dimensional shape, and the control part 12 that generates the arc passing the three object points, based on the three object points in the shape point sequence acquired by the acquisition part 11, and determines whether the approximation division point that should not be approximated in the three-dimensional shape is included in the three object points, based on the arc. Dedicated hardware may be applied to the processing circuit 81, or a processor that executes a program stored in the memory may be applied. The processor corresponds to, for example, a central processing unit, a processing apparatus, an arithmetic operation apparatus, a microprocessor, a microcomputer, a DSP (Digital Signal Processor), or the like.

In the case where the processing circuit 81 is dedicated hardware, the processing circuit 81 may be, for example, a single circuit, a composite circuit, a programmed processor, a parallel-programmed processor, an ASIC (Application Specific Integrated Circuit), an FPGA (Field Programmable Gate Array), or a combination thereof. The respective functions of the parts such as the acquisition part 11 and the like may be realized by circuits in which the processing circuits are distributed, or may be realized by one processing circuit in which the respective functions of the parts are collected.

When the processing circuit 81 is a processor, the functions of the acquisition part 11 and the like are realized in combination with software and the like. The software and the like, for example, correspond to software, firmware, or software and firmware. Software and the like are described as a program and stored in the memory. As shown in FIG. 18, a processor 82 applied to the processing circuit 81 realizes the functions of the respective parts by reading and executing the program stored in the memory 83. That is, the map data generating apparatus 1 includes the memory 83 for storing the program that consequently executes a step of acquiring the shape point sequence indicating the three-dimensional shape, and a step of generating the arc passing the three object points, based on the three object points in the acquired shape point sequence, and determining whether the approximation division point that should not be approximated in the three-dimensional shape is included in the three object points, based on the arc, when the program is executed by the processing circuit 81. In other words, it can also be said that this program causes a computer to execute a procedure and a method of the acquisition part 11 and the like. Here, the memory 83 corresponds to any storage medium including a nonvolatile or a volatile semiconductor memory such as a RAM (Random Access Memory), a ROM (Read Only Memory), a flash memory, an EPROM (Erasable Programmable Read Only Memory), an EEPROM (Electrically Erasable Programmable Read Only Memory), or the like, an HDD (Hard Disk Drive), a magnetic disk, a flexible disk, an optical disk, a compact disk, a mini disk, a DVD (Digital Versatile Disc) and a drive apparatus thereof, and the like.

In the foregoing, the configuration in which the respective functions of the acquisition part 11 and the like are realized by any one of hardware, software, and the like has been described. However, the present invention is not limited to this, and the configuration may be such that part of the acquisition part 11 and the like is realized by dedicated hardware, and another part is realized by software and the like. For example, as to the acquisition part 11, its function can be realized by a processing circuit as dedicated hardware such as a receiver, and as for the others, the processing circuit 81 as the processor 82 can read and execute the program stored in the memory 83 to realize their functions. As described above, the processing circuit 81 can realize the above-described functions by hardware, software, or the like, or a combination thereof.

It should be noted that, within the scope of the invention, the present invention can freely combine the embodiments and the modifications, and can appropriately modify and omit the embodiments and the modifications.

Although the present invention has been described in detail, the above description is illustrative in all aspects, and the present invention is not limited thereto. It is understood that innumerable modifications not illustrated can be envisaged without departing from the scope of the present invention.

EXPLANATION OF REFERENCE SIGNS

1: map data generating apparatus
11: acquisition part
12: control part
31: arc
31a, 31b: partial arc
71: car navigation apparatus
La, Lb: line segment

The invention claimed is:

1. A map data generating apparatus capable of generating map data representing a three-dimensional shape, using approximation, the map data generating apparatus comprising:
a receiver to receive a shape point sequence indicating the three-dimensional shape; and
a controller to
generate a circle corresponding to an arc passing through three object points included in the shape point sequence, based on the three object points,
find an index indicating a difference between a line segment connecting a middle point of the three object points and another point of the three object points in the shape point sequence and a partial arc corresponding to the line segment in the arc, and
determine whether the middle point should be an approximation division point that should not be approximated in the three-dimensional shape based on the index such that if the index is larger than a predetermined value, the middle point should be an approximation division point,
wherein the three object points are any one of three points whose order in the shape point sequence is continuous, and whose order in the shape point sequence is every N in the shape point sequence acquired by the receiver, where N is a natural number.

2. The map data generating apparatus according to claim 1, wherein when it is determined that the approximation division point is included in the three object points, the controller divides the shape point sequence acquired by the receiver by the approximation division point, and generates an approximate line approximating the three-dimensional shape, based on the divided shape point sequence.

3. The map data generating apparatus according to claim 1, wherein by repeating change of the three object points, the controller performs generation of the arc and determination of the approximation division point for all points of the shape point sequence.

4. The map data generating apparatus according to claim 1, wherein the controller uses three points designated from an outside of the map data generating apparatus in the shape point sequence as the three object points.

5. The map data generating apparatus according to claim 1, wherein the controller uses a distance between a predetermined point on the line segment and the partial arc as the index.

6. The map data generating apparatus according to claim 1, wherein the controller uses an area of a region surrounded by the line segment and the partial arc as the index.

7. The map data generating apparatus according to claim 1, wherein the controller generates a first arc by using first three points in the shape point sequence as the three object points, and further generates a second arc by using, as the three object points, second three points obtained by shifting one by one from the first three points in the shape point sequence, and determines that the approximation division point is included in a point overlapping each other between the first three points and the second three points, when a difference between a curvature of the first arc and a curvature of the second arc is larger than a predetermined threshold value.

8. The map data generating apparatus according to claim 1, wherein the controller determines that the approximation division point is included in the three object points when a curvature of the arc is larger than a predetermined threshold value.

9. The map data generating apparatus according to claim 1, wherein the controller performs first processing including the generation of the arc and the determination of the approximation division point while sequentially changing the three object points from one edge point to the other edge point of the shape point sequence acquired by the receiver, and second processing including the generation of the arc and the determination of the approximation division point while sequentially changing the three object points from the other edge point to the one edge point of the shape point sequence acquired by the receiver, and determines that a first point is not the approximation division point as a result of the first processing and the second processing, when it is determined that the first point is not the approximation division point in at least one of the first processing and the second processing.

10. The map data generating apparatus according to claim 9, wherein when it is determined that the first point is the approximation division point in the first processing and it is determined that the first point is not the approximation division point in the second processing, the controller determines that a second point obtained by shifting by one point from the first point to the one edge point side is the approximation division point.

11. A terminal apparatus capable of representing the three-dimensional shape, using the map data generated by the map data generating apparatus according to claim 1.

12. A map data generating method capable of generating map data representing a three-dimensional shape, using approximation, the method comprising:
  acquiring a shape point sequence that is a point sequence indicating the three-dimensional shape;
  generating a circle corresponding to an arc passing through three object points included in the shape point sequence, based on the three object points;
  finding an index indicating a difference between a line segment connecting a middle point of the three object points and another point of the three object points in the shape point sequence and a partial arc corresponding to the line segment in the arc; and
  determining whether the three points include an approximation division point that should not be approximated in the three-dimensional shape based on the index such that if the index is larger than a predetermined value the middle point should be an approximation division point,
  wherein the three object points are any one of three points whose order in the shape point sequence is continuous, and whose order in the shape point sequence is every N in the acquired shape point sequence, where N is a natural number.

* * * * *